United States Patent [19]

Okajima et al.

[11] Patent Number: 5,280,463
[45] Date of Patent: Jan. 18, 1994

[54] LOADING AND EJECTING DEVICE FOR A DISK PLAYER

[75] Inventors: Takahiro Okajima; Yasuyuki Tashino, both of Saitama, Japan

[73] Assignee: Pioneer Electronic Corporation, Tokyo, Japan

[21] Appl. No.: 906,340

[22] Filed: Jun. 30, 1992

[30] Foreign Application Priority Data

Sep. 17, 1991 [JP] Japan ................... 3-262644

[51] Int. Cl.⁵ ................ G11B 17/22; G11B 17/08
[52] U.S. Cl. .................... 369/36; 369/75.1; 360/98.06
[58] Field of Search .......... 369/36, 75.1, 77.2; 360/98.06, 99.06, 99.07

[56] References Cited

U.S. PATENT DOCUMENTS

| | | | |
|---|---|---|---|
| 4,716,477 | 12/1987 | Uehara | 360/99.07 |
| 4,797,865 | 1/1989 | Imai et al. | 369/36 |
| 4,931,891 | 6/1990 | Ando | 360/99.06 |
| 5,058,090 | 10/1991 | Ueno et al. | 369/36 |
| 5,097,465 | 3/1992 | Funabashi et al. | 369/77.2 |

Primary Examiner—Richard A. Bertsch
Assistant Examiner—Howard R. Richman
Attorney, Agent, or Firm—Nikaido, Marmelstein, Murray & Oram

[57] ABSTRACT

A CD player has a magazine containing a plurality of trays, and a single tray. The magazine is provided to be loaded by hand, and the single tray is slidably mounted in the casing between a playback position and an ejected position. A lock device is provided for locking the magazine at a loading position. A disc cam is provided for operating the lock device and the single tray. A pin is mounted on the disc cam and operatively connected to the single tray so as to move the single tray between the playback position and the ejected position in rotating range of the cam. The cam is provided to be operatively connected to the lock device. The cam is arranged to operate the lock device so as to release the magazine when the cam is rotated in a range outside the rotating range.

4 Claims, 7 Drawing Sheets

PRIOR ART

LOADING AND EJECTING DEVICE FOR A DISK PLAYER

BACKGROUND OF THE INVENTION

The present invention relates to a loading and ejecting device of a disc player having a magazine and a single tray.

A disc player such as a CD player having a magazine and a single tray has been proposed.

Figure 7:
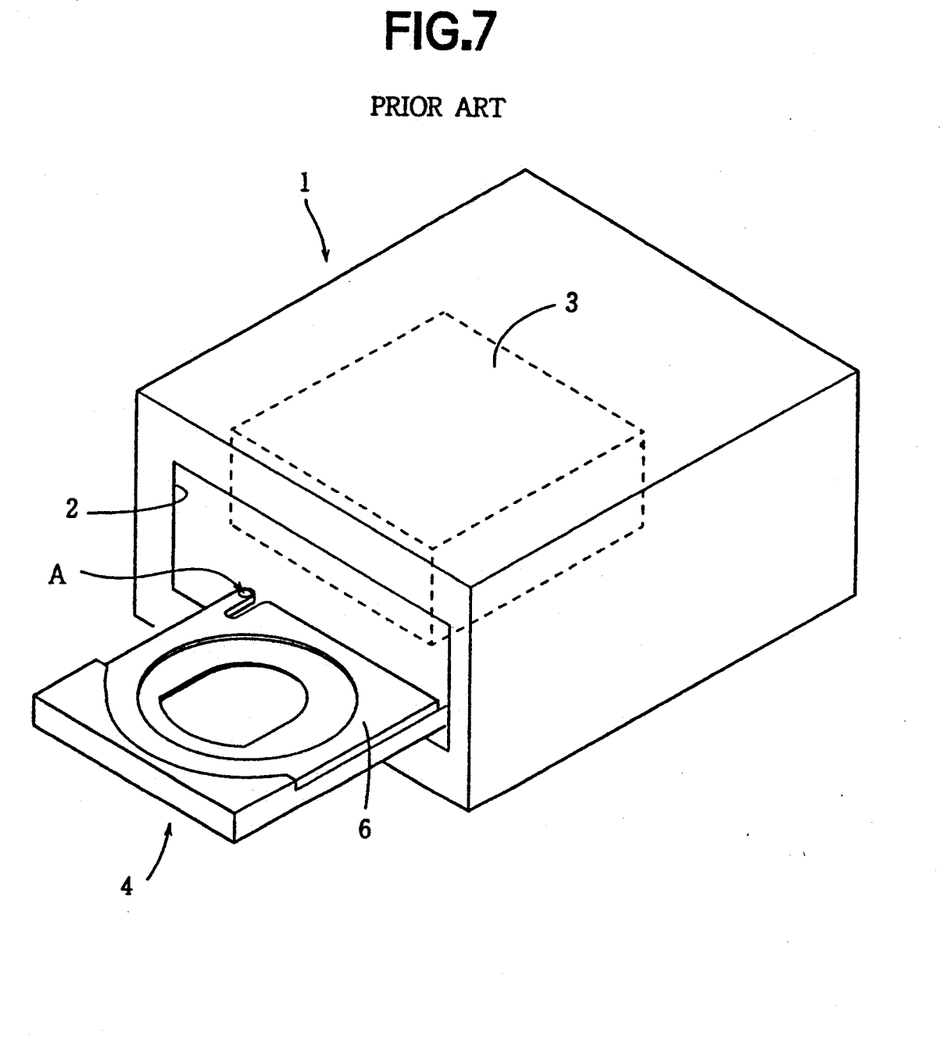
FIG. 7 is a perspective view showing a conventional disc player.

FIG. 7 shows a conventional CD player having a casing 1 provided with an opening 2 on a front portion thereof. A magazine 3 is detachably inserted into the casing 1 through the opening 2. A single tray 4 is slidably mounted in the casing. The single tray 4 has a tray body 6 which is rotatable about a pivot A. The magazine 3 has a plurality of vertically layered trays each of which holds a compact disc. The trays are detachably housed in the magazine 3 for changing the CDs thereon. On the tray body 6 of the single tray 4, only one CD is mounted. A reproducing device (not shown) including a clamp device, a turntable, and a pickup is provided on a rear portion of the casing 1.

The player has an individual loading and ejecting device for the magazine 3 and for the single tray 4. A motor is provided in each of the loading and ejecting devices for operating the device.

When loading the magazine 3 in the player, the magazine 3 is pushed into the casing 1 by hand through the opening 2. The loading and ejecting device for the magazine 3 is operated to load the magazine on a predetermined position in the casing. When ejecting, the magazine is ejected from the casing with the loading and ejecting device by operating an ejection button for the magazine 3. Then, the magazine ejected from the opening 2 is pulled out by hand to release from the casing.

In order to load the signal tray 4 on the player, a loading button for the single tray provided on the player is operated. The loading and ejecting device of the single tray is operated to load the single tray 4 on a predetermined position in the player. When ejecting, an ejection button for the single tray is operated to operate the loading and ejecting device for the single tray. Thus, the single tray 4 is ejected from the opening 2.

When the playback of the CD in the magazine 3 is started, a selected tray is pushed out from the magazine 3 and moved to a playback position through a loading mechanism. Then the disc is removed from the tray and clamped on the turntable by the clamp device. The disc is thereafter rotated at a predetermined speed so that information written on the disc is read out by the pickup.

When the playing of the disc finishes, the disc is released from the turntable and put on the tray by the clamp device. Thereafter, the tray is returned to the magazine.

When the playback of the disc on the single tray 4 is started, the tray body 6 is rotated about the pivot A. The disc removed from the tray body 6 and clamped on the turntable is playbacked in the same manner. When the playing of the disc finishes, the disc is returned to the tray body 6.

A plurality of discs are continuously playbacked in this manner. Furthermore, since the single tray is provided, the disc is easily changed compared with a player having only magazines.

However, since the loading and ejecting devices are operated by the respective motors, and the other parts for driving the devices are necessary, the number of parts increases. Thus, a system for the loading and ejecting devices is complicated in construction and it is necessary to provide a space for the parts. Accordingly, the cost increases and the size of the player cannot by reduced.

SUMMARY OF THE INVENTION

An object of the present invention is to provide a loading and ejecting device for a CD player where a magazine and a single tray are loaded and ejected with a simple construction, thereby reducing the size and thickness and the cost of the player.

According to the present invention, there is provided a loading and ejecting device for a disc player having a casing, a detachable magazine containing a plurality of trays each of which mounts a disc, a single tray for mounting a disc, the magazine being provided to be loaded at a loading position in the casing by hand, and the single tray being slidably mounted in the casing between a playback position and an ejected position.

The device comprises a lock device for locking the magazine at the loading position, a loading member slidably mounted in the casing and operatively connected to the single tray, a cam member for operating the lock device and the loading member, a motor for rotating the cam member, an actuating member provided on the cam member and operatively connected to the loading member so as to move the single tray between the playback position and the ejected position in a rotating range of the cam member, releasing means provided on the cam member and operatively connected to the lock device, the releasing member being provided for operating the lock device so as to release the magazine when the cam member is rotated in a range outside the rotating range.

In an aspect of the invention, the cam member is a disc cam, and the actuating member is a pin mounted on the disc cam.

The other objects and features of this invention will become understood from the following description with reference to the accompanying drawings.

DETAILED DESCRIPTION OF THE PREFERRED EMBODIMENT

Figure 1:
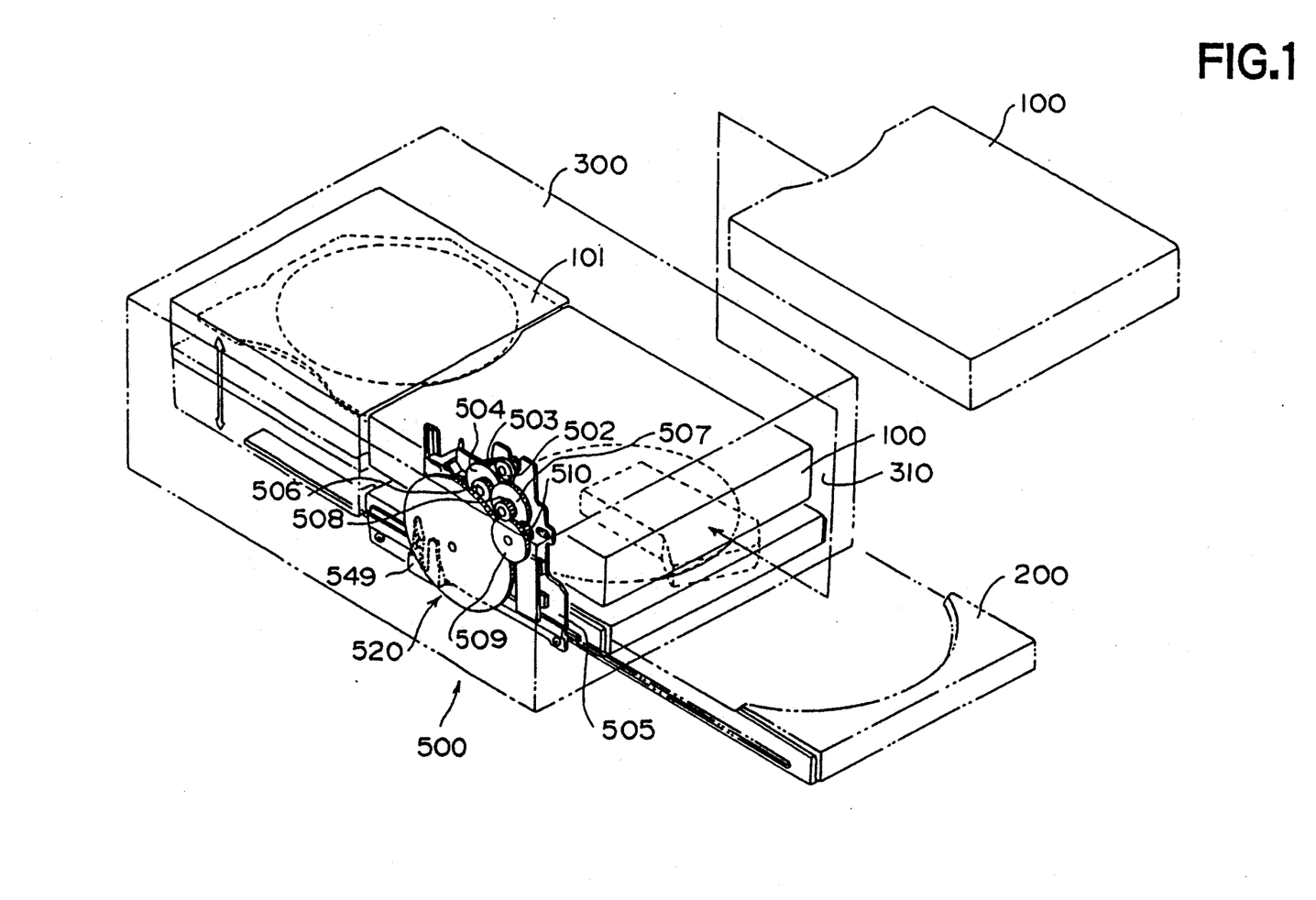
FIG. 1 is a schematic perspective view of a disc player having a loading and ejecting device according to the present invention.
Figure 2:
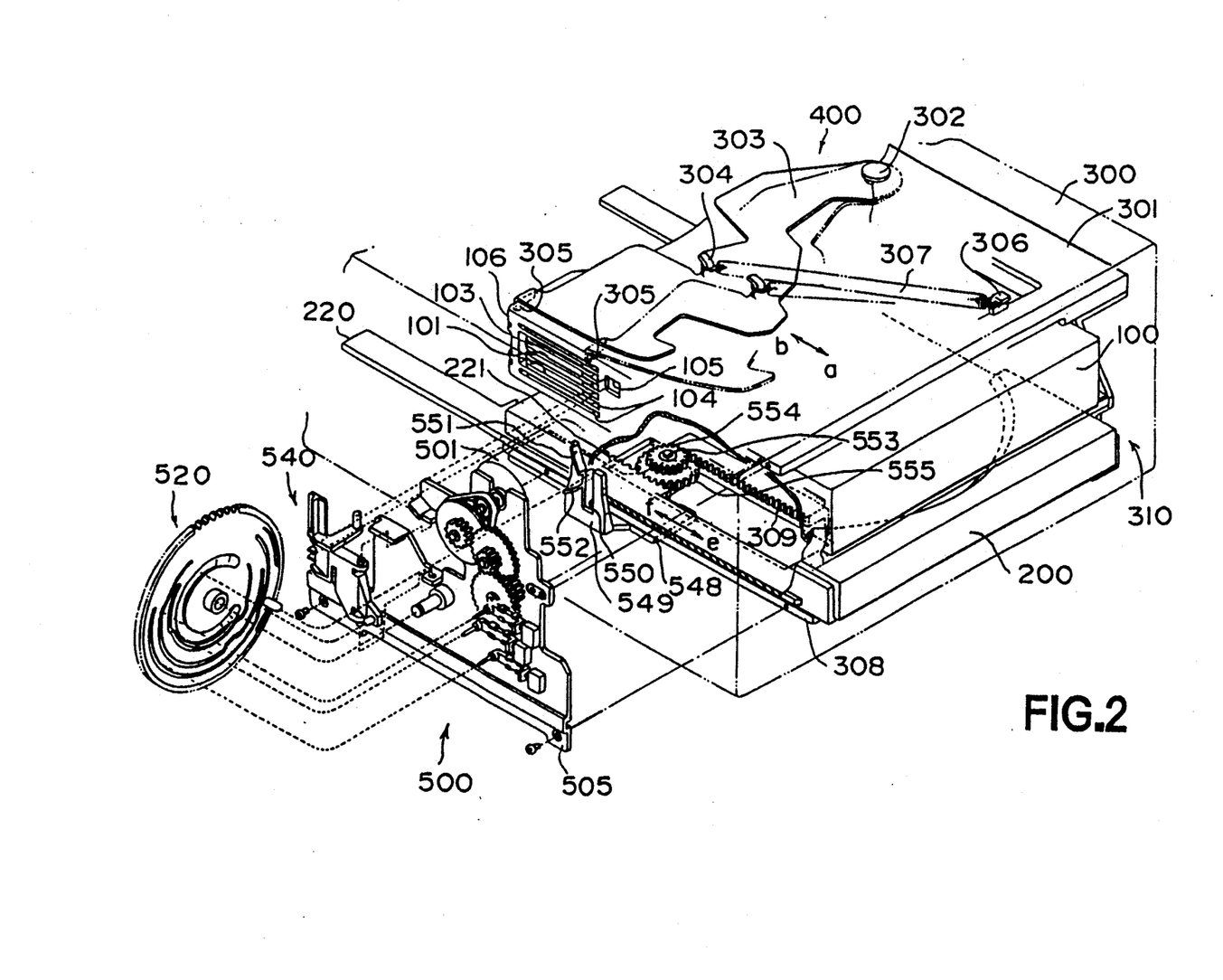
FIG. 2 is an exploded perspective view of the loading and ejecting device.

Referring to FIGS. 1 and 2, a disc player comprises a casing 300 having an opening 310. A magazine 100 and a single tray 200 are inserted into the casing 300 through the opening 310. In the casing 300, a magazine holder 301 for receiving the magazine 100 and a single tray holder 308 for receiving the single tray 200 are provided. A loading and ejecting device 500 is provided in the casing 300 adjacent the magazine 100 and the single tray 200.

As shown in FIG. 2, a plurality of trays 101 are housed in the magazine 100. The trays 101 are rotatably mounted in the magazine 100 about an axis 103. These trays 101 are separated from each other with partitions 104. The magazine 100 has an engaging recess 105 provided at one of lateral sides thereof.

Since the magazine 100 has the same construction as disclosed in Japanese Patent Application Laid-Open 62-14370, the detailed description thereof is omitted. Further, the single tray 200 has the same construction as the conventional one.

On the magazine holder 301, a magazine ejecting device 400 is mounted. The device 400 comprises a swing lever 303 pivotally mounted on the holder by a pin 302. The swing lever 303 has a lug 304 and a magazine abutting end 305. A spring 307 is provided between the lug 304 and a lug 306 formed on the holder 301. Thus, the lever 303 is urged by the spring in the direction shown by an arrow a.

The loading and ejecting device 500 comprises a supporting plate 505 secured to the lateral sides of the magazine holder 301 and the tray holder 308.

Figure 3:
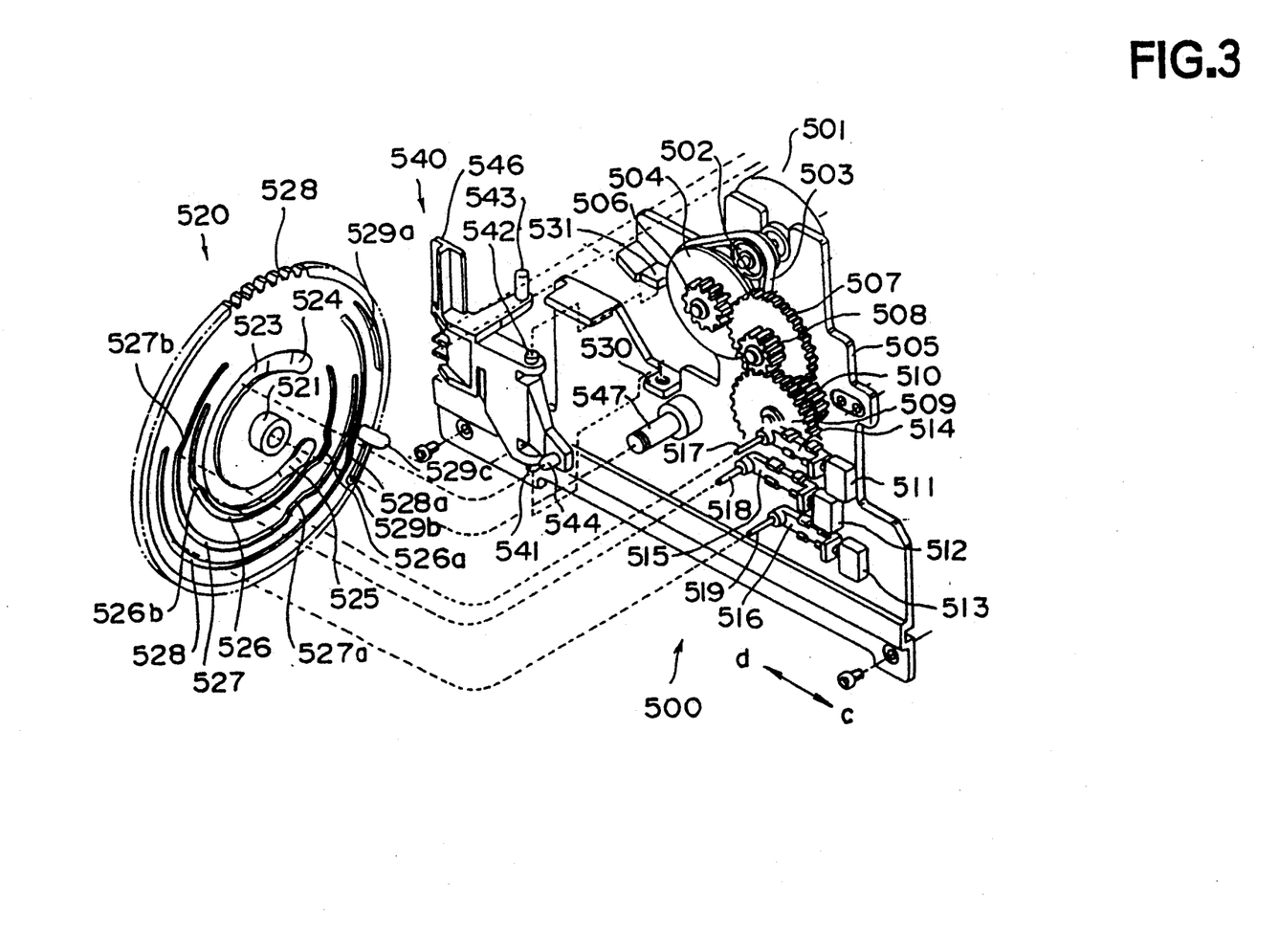
FIG. 3 is an enlarged and exploded perspective view of the loading and ejecting device.

Referring to FIG. 3, a motor 501 is mounted on the supporting plate 505 for driving the loading and ejecting device. Securely mounted on a rotating shaft of the motor 501 is a drive pulley 502. A belt 503 is provided between the drive pulley 502 and a pulley 504 rotatably mounted on the supporting plate 505. A pinion 506 coaxially mounted on a shaft of the pulley 504 is engaged with a gear 507 rotatably mounted on the supporting plate. The gear 507 has a pinion 508 coaxially mounted on a shaft thereof to be engaged with a gear 509 rotatably mounted on the supporting plate. A pinion 510 is coaxially mounted on a shaft of the gear 509. A shaft 547 is rotatably mounted on the supporting plate 505 on the lower portion of the pulley 504. Secured to the shaft 547 is a boss 521 of a disc cam 520 which has teeth 528 formed on the periphery thereof to be engaged with the pinion 510. Thus, the disc cam 520 is operatively connected to the motor 501.

Figure 4:
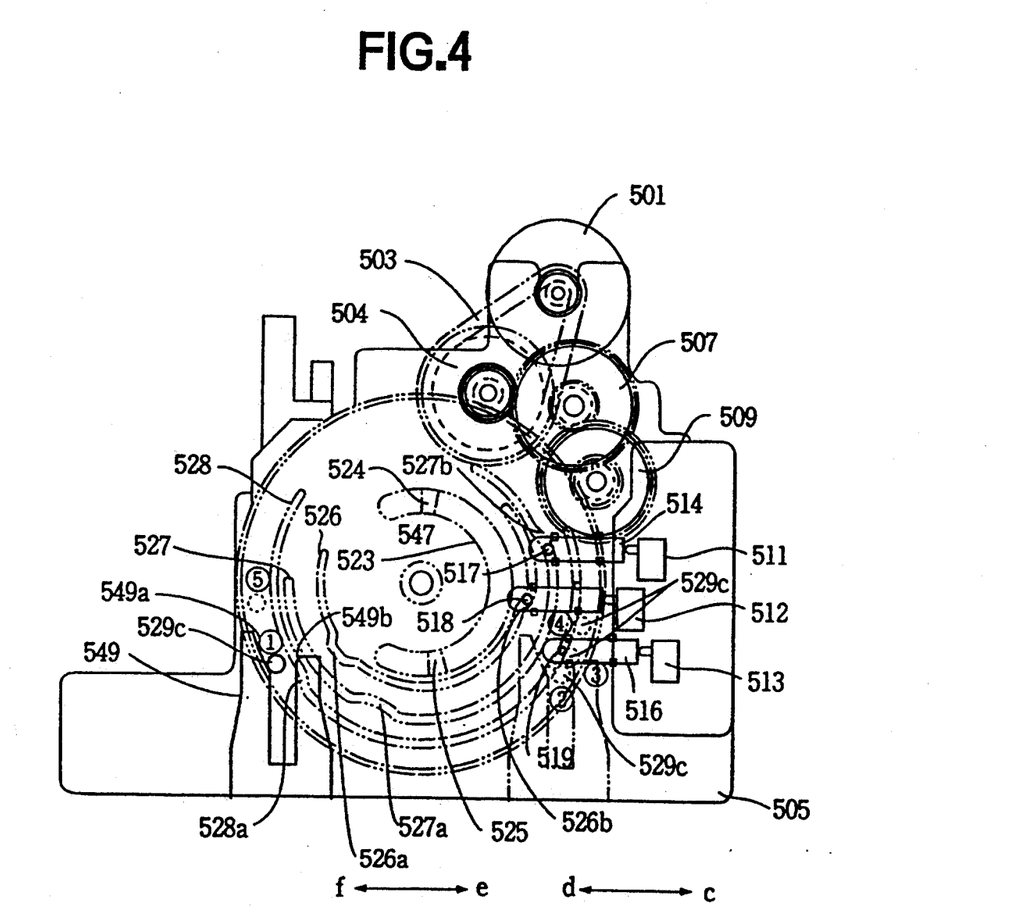
FIG. 4 is a plan view of the loading and ejecting device showing the operation thereof.

The disc cam 520 has an arcuated cam groove 523 formed around the boss 521, three cam grooves 526, 527 and 528, a pair of arcuated ribs 529a and 529b, and a pin 529c. The cam groove 523 has slopes 524 and 525 formed at both ends thereof. As shown in FIG. 4, the cam groove 526 has cam portions 526a and 526b, the cam groove 527 has cam portions 527a and 527b, and the cam groove 528 has a cam portion 528a.

Near the gear 509, three detecting switches 511, 512 and 513 are mounted on the supporting plate 505 for detecting an ejecting position of the magazine 100 and a loading position or an ejecting position of the single tray 200. The detecting switches 511, 512 and 513 are adapted to be operated by three slide plates 514, 515 and 516 slidably mounted on the supporting plate 505, respectively. When the slide plate moves in the direction shown by an arrow c, the end of the slide plate pushes an actuating rod of the switch to close the switch. The slide plate 514 has a pin 517 provided on the other end thereof to be slidably engaged with the cam groove 527 of the disc cam 520. The slide plate 515 has a pin 518 slidably engaged with the cam groove 526, and the slide plate 516 has a pin 519 slidably engaged with the cam groove 528.

A magazine lock member 540 is provided on the supporting plate 505. The lock member comprises a pair of pivots 541 and 542 engaged with recesses formed on pivot portions 530 and 531 provided on the supporting plate 505. Thus, the magazine lock member 540 is pivotally mounted on the supporting plate. The lock member further has a lock pin 543 to be engaged with the recess 105 of the magazine 100 for locking the magazine, an engaging pin 544 slidably engaged with the arcuated cam groove 523 of the disc cam 520, and a projecting plate 546.

Referring back to FIG. 2, a slide plate 548 is slidably mounted on the rear portion of the tray holder 308 of the single tray 200 to be slidable in the directions shown by arrows e and f. The slide plate 548 is provided with a U-shaped loading member 549 integral with the slide plate and disposed adjacent the lateral side of the single tray 200. The loading member 549 has a vertical slit 550 with which the pin 529c of the disc cam 520 is slidably engaged, and beveled projecting portions 551 and 552 engaged with the ribs 529a and 529b, respectively.

The slide plate 548 further has a shaft 553 securely mounted thereon opposite to the loading member 549. An integrated large pinion 555 and a small pinion 554 are rotatably mounted on the shaft 553. The gear ratio between the pinions 554 and 555 is determined 1:2. The large pinion 555 is engaged with a rack 221 formed on a guide plate 220 of the single tray 200. The small pinion 554 is engaged with a rack 309 formed on the tray holder 308. Thus, when the loading member 549 is moved in the direction e or f, the single tray 200 can be moved twice.

Figure 5:
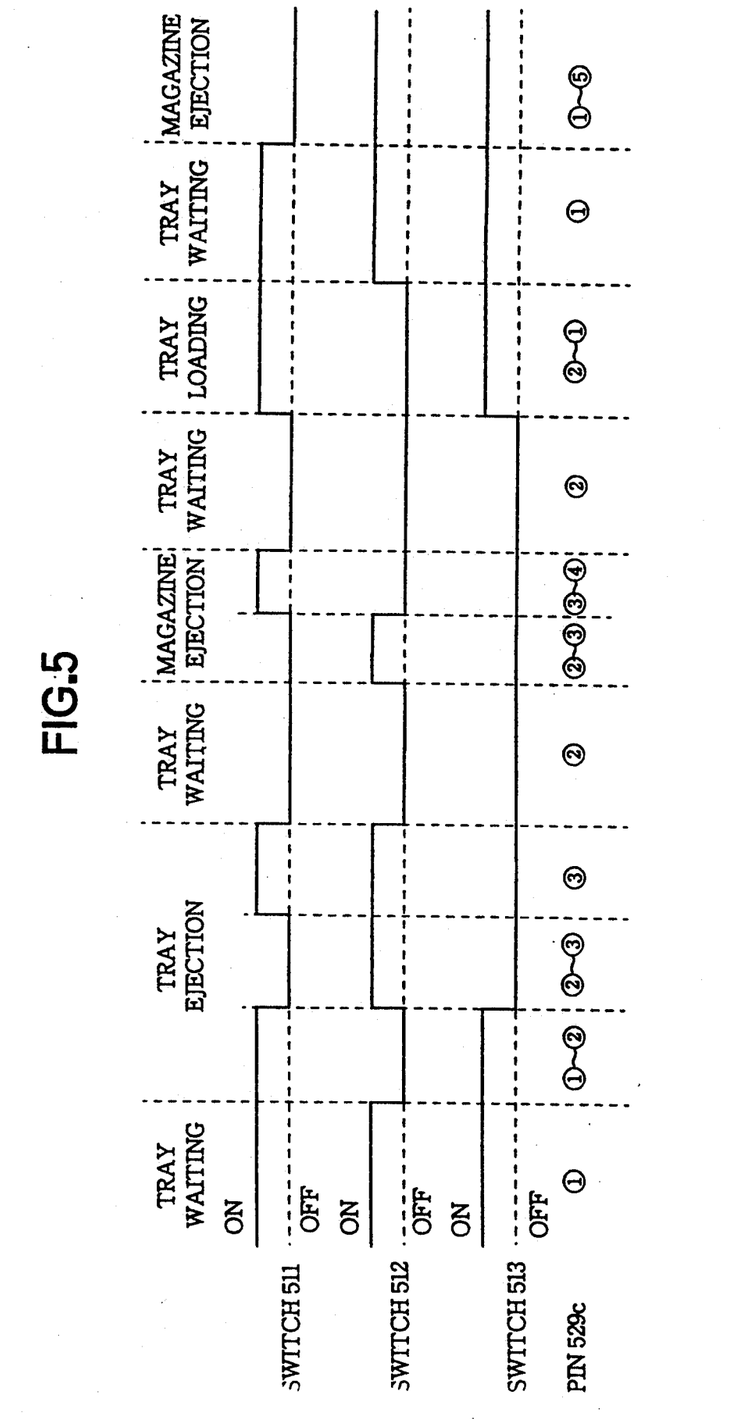
FIG. 5 is a time chart showing the operation of disc cam of the device.

The operation of the loading and ejecting device 500 will be described hereinafter with reference to FIGS. 4 and 5.

The description starts from the situation where the magazine 100 and the single tray 200 are mounted in the casing 300. The magazine 100 is inserted into the magazine holder 301 from the opening 310 by hand. A side 106 of the magazine abuts on the end 305 of the swing lever 303 to pivot the lever in the direction shown by an arrow b against the spring 307. When the magazine 100 reaches the innermost portion of the holder 301, the lock pin 543 of the lock member 540 is engaged with the recess 105 of the magazine, so that the magazine 100 is locked in the magazine holder 301 with the lock member 540.

The single tray 200 is automatically loaded in the casing by operating a tray loading button. A detailed description of loading will be described hereinafter.

When the magazine 100 and the single tray 200 are mounted in the casing 300, the pin 529c of the disc cam 520 is at the position ① of FIG. 4 where the pin 529c is engaged with a beveled portion 549a of the loading member 549. In this state, the slide plates 514, 515 and 516 make the detecting switches 511, 512 and 513, to close their contacts.

In order to eject the single tray 200, a tray ejecting button (not shown) is operated. The motor 501 is operated to rotate the disc cam 520 in the counterclockwise direction in FIG. 4. The pin 529c slides on the beveled portion 549a and enters the slit 550 to push the inside wall of the slit and moves to the position ③ through the position ②. Thus, the loading member 549 is moved in the direction e.

On the other hand, when the disc cam 520 starts to rotate, the pins 517, 518 and 519 of the slide plates 514, 515 and 516 are slid in the cam grooves 527, 526 and 528, respectively. When the pin 529c is moved from the position ① to the position ②, the pin 518 of the slide plate 515 slides on the cam portion 526b so that the slide plate 515 is moved in the direction d to open the switch 512. When the pin 529c is moved from the position ② to the position ③, the pin 518 engages with the cam portion 526a so that the slide plate 515 is moved in the direction c to close the switch 512. To the contrary, the pin 517 of the slide plate 514 slides on the cam portion 527a and the pin 519 of the slide plate 516 slides on the cam portion 528a. Thus, the slide plates 514 and 516 are moved in the direction d to open the switches 511 and 513.

When the loading member 549 is moved in the direction e, the single tray 200 is moved in the tray holder in the same direction as the member 549 by the stroke twice as long as the loading member.

At the position ③ where the pin 529c engages with an edge portion 549b of the loading member 549, the single tray 200 is ejected from the opening 310 of the casing 300. In this state, the detecting switches 511 and 512 are closed and the switch 513 is opened.

When the ejection of the single tray 200 is completed, the disc cam 520 is slightly rotated in the clockwise direction to move the pin 529c at the position ②. Thus, the pin 529c engages with the wall of the slit 550 of the loading member 549. The pin 517 is engaged with the cam portion 527a and the pin 518 is disengaged from the cam portion 526a so that the slide plates 514 and 515 are moved in the direction d to open the switches 511 and 512. Consequently, at the position ②, all of the detecting switches are opened. At the position ②, the pin 529c is positioned deeper in the slit 550. Therefore the loading member 549 properly pushes the pin 529c in the direction f when the single tray 200 is pushed in the casing 300.

In order to eject the magazine 100 after the ejection of the tray 200, a magazine ejecting button (not shown) is operated. The disc cam 520 is further rotated in the counterclockwise direction by the motor 501 to move the pin 529c from the position ② to the position ④ through the position ③ where the pin 529c is removed from the loading member 549. The pin 517 is disengaged from the cam portion 527a so that the slide plate 514 is moved in the cam portion 527a so that the slide plate 514 is moved in the direction c to close the switch 511. The pin 518 engaged with the cam portion 526a when the pin 529c is moved from the position ② to the position ③ is disengaged from the cam portion 526a so that the slide plate 515 is moved in the direction d to open the switch 512. The switch 513 is still opened.

The engaging pin 544 of the lock member 540 slidably engaged with the cam groove 523 is engaged with the slope 525 so that the pin 544 is inwardly pushed. Thus, the lock member 540 is pivoted about the pivot portions 530 and 531 in the counterclockwise direction in the plane of FIG. 3 to disengage the lock pin 543 from the recess 105 of the magazine 100. As a result, the magazine 100 is released, and hence the swing lever 303 is rotated in the direction a by the spring 307 and the abutting end 305 pushes the magazine in the forward direction of the magazine holder. Thus, the magazine 100 is ejected from the casing 300 through the opening 310.

When the pin 529c is at the position ④, the rib 529a of the disc cam 520 is engaged with the projecting portion 552 of the loading member 549 so that the loading member is prevented from moving in the direction f, thereby restricting the single tray 200 to be loaded.

Immediately after the magazine 100 is released from locking by the lock member 540, the pin 529c is moved to the position ②.

In order to load the single tray 200 in the casing 300, a tray loading button is operated. The disc cam 520 starts to rotate in the clockwise direction by the motor 501 so that the pin 529c engaged with the slit 550 of the loading member 549 is moved from the position ② to the position ① to push the wall of the slit. Thus, the loading member 549 is moved in the direction f. The single tray 200 is loaded in the tray holder of the casing by the stroke twice as long as the loading member 549.

When the pin 529c is moved from the position ② to the position ①, the pin 518 is disengaged from the cam portion 526a so that the slide plate 515 is moved in the direction d to open the switch 512. At the position ①, the pin 518 is engaged with the cam portion 526b. The slide plate 515 is moved in the direction c to close the switch 512.

In order to eject the magazine 100 under the condition that the tray 200 is loaded, the magazine ejecting button is operated. The disc cam 520 is further rotated in the clockwise direction by the motor 501 to move the pin 529c from the position ① to a position ⑤ where the pin 529c is removed from the loading member 549. The pin 517 is engaged with the cam portion 527b so that the slide plate 514 is moved in the direction d to open the switch 511.

The engaging pin 544 of the lock member 540 is engaged with the slope 524 of the cam groove 523 to be pushed, so that the lock member 540 is pivoted about the pivot portions 530 and 531 in the counterclockwise direction to disengage the lock pin 543 from the recess 105 of the magazine 100. Thus, the magazine 100 is ejected from the casing 300 through the opening 310 in the same manner as hereinbefore described.

When the pin 529c is at the position ⑤, the rib 529b of the disc cam 520 is engaged with the projecting portion 551 of the loading member 549 so that the loading member is prevented from moving in the direction e, thereby restricting the single tray 200 to be ejected.

Immediately after the magazine 100 is released from locking by the lock member 540, the pin 529c is moved to the position ①.

Figure 6:
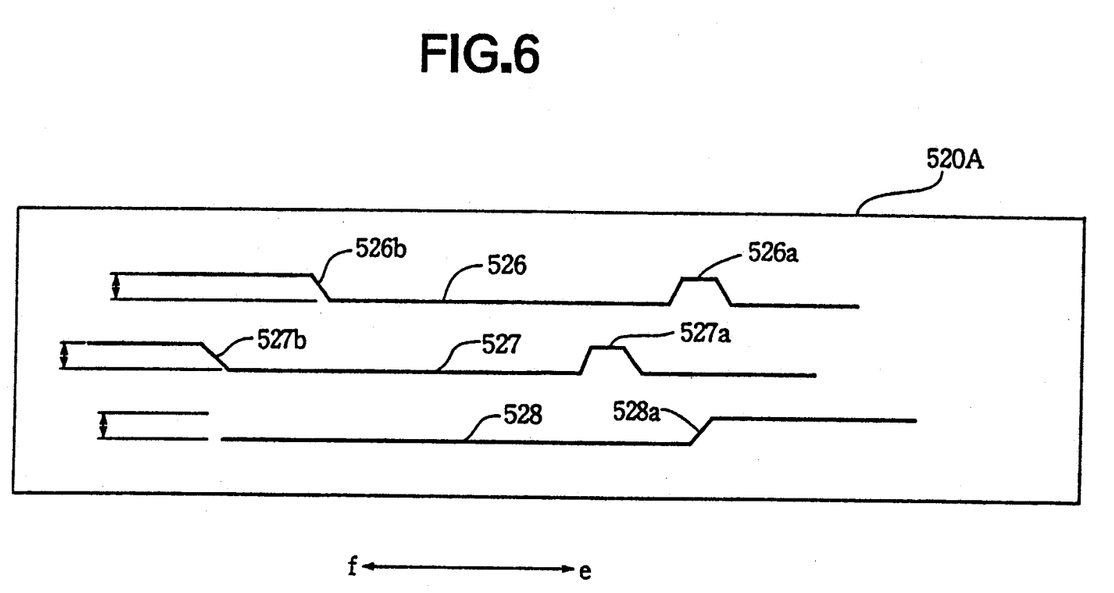
FIG. 6 is a development showing a modification of the cam disc.

In place of the disc cam 520, a cam plate 520A shown in FIG. 6 can be used for the loading and ejecting device. Similar to the disc cam 520, the cam plate 520A has cam grooves 526, 527 and 528. Cam portions 526a and 526b, 527a and 527b, and 528a are provided on the respective grooves.

In accordance with the present invention, the loading and ejecting device is provided with the disc cam rotated by a motor and operatively connected to a loading member for loading or ejecting the single tray. When the single tray is loaded or ejected, the magazine is ejected by operating the disc cam.

Therefore, the number of motors and other parts for operating the device is reduced to reduce the space for the device. Consequently, the construction of the device is simplified and the size and cost of the player are reduced.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A loading and ejecting device for a disc player having a casing, a detachable magazine containing a plurality of trays each of which mounts a disc, a single tray for mounting a disc, the magazine being provided to be loaded at a loading position in the casing by hand, and the single tray being slidably mounted in the casing between a playback position and an ejected position, comprising:

a lock device for locking the magazine at the loading position;

a loading member slidably mounted in the casing and operatively connected to the single tray;

a cam member for operating the lock device and the loading member;

a motor for rotating the cam member;

an actuating member provided on the cam member and operatively connected to the loading member so as to move the single tray between the playback position and the ejected position in a rotating range of the cam member; and releasing means provided on the cam member and operatively connected to the lock device, the releasing means being provided for operating the lock device so as to release the magazine when the cam member is rotated in a range outside the rotating range.

2. A device according to claim 1, wherein the cam member is a disc cam.

3. A device according to claim 1, wherein the actuating member is a pin mounted on the cam member.

4. A device according to claim 2, wherein the releasing means is a slope formed on the disc cam for operating the lock device.

* * * * *